United States Patent
Wiebenga et al.

(10) Patent No.: US 10,400,654 B2
(45) Date of Patent: Sep. 3, 2019

(54) NOX STORAGE CATALYST MONITORING METHODS

(71) Applicant: GM Global Technology Operations LLC, Detroit, MI (US)

(72) Inventors: Michelle H. Wiebenga, Warren, MI (US); Shouxian Ren, Rochester Hills, MI (US); Wei Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 59 days.

(21) Appl. No.: 15/881,015

(22) Filed: Jan. 26, 2018

(65) Prior Publication Data

US 2019/0234281 A1   Aug. 1, 2019

(51) Int. Cl.
| | |
|---|---|
| *F01N 11/00* | (2006.01) |
| *F01N 3/08* | (2006.01) |
| *F01N 3/035* | (2006.01) |
| *F01N 3/20* | (2006.01) |
| *B01D 53/94* | (2006.01) |

(Continued)

(52) U.S. Cl.
CPC ........ *F01N 11/002* (2013.01); *B01D 46/0027* (2013.01); *B01D 53/9418* (2013.01); *B01D 53/9422* (2013.01); *B01D 53/9477* (2013.01); *B01D 53/9495* (2013.01); *F01N 3/035* (2013.01); *F01N 3/0814* (2013.01); *F01N 3/0842* (2013.01); *F01N 3/2066* (2013.01); *G07C 5/0825* (2013.01); *B01D 2255/904* (2013.01); *B01D 2255/91* (2013.01); *B01D 2279/30* (2013.01); *F01N 2550/02* (2013.01); *F01N 2550/03* (2013.01); *F01N 2570/14* (2013.01); *F01N 2610/02* (2013.01)

(58) Field of Classification Search
CPC ...... F01N 3/035; F01N 3/0814; F01N 3/0842; F01N 3/2066; F01N 11/002; F01N 2550/02; F01N 2550/03; F01N 2570/14; F01N 2610/02; B01D 46/0027; B01D 53/9418; B01D 53/9422; B01D 53/9477; B01D 53/9495; B01D 2255/904; B01D 2255/91; B01D 2279/30
See application file for complete search history.

(56) References Cited

U.S. PATENT DOCUMENTS

| | | |
|---|---|---|
| 8,720,189 B2 | 5/2014 | Ren et al. |
| 9,708,953 B1 | 7/2017 | Szailer et al. |
| 2011/0047987 A1* | 3/2011 | Yoda ............... F01N 3/0814 60/287 |

FOREIGN PATENT DOCUMENTS

EP         1555401 A1 *  7/2005  ........... F01N 3/0235

* cited by examiner

*Primary Examiner* — Audrey K Bradley (57) ABSTRACT

A method for monitoring and diagnosing an engine exhaust treatment of an internal combustion engine in a motor vehicle includes monitoring a nitrogen oxides (NOx) storage catalyst disposed in an engine exhaust stream downstream of the engine, determining a first diagnostic condition of the NOx storage catalyst based on data from a first EGT sensor and a second EGT sensor; determining a second diagnostic condition of the NOx storage catalyst based on a comparison of temperatures reported by a first NOx sensor and a second NOx sensor, selectively pausing the first diagnostic condition and the second diagnostic condition during a predetermined NOx storage catalyst regeneration period, and selectively generating a notification for an operator of the motor vehicle.

18 Claims, 3 Drawing Sheets

(51) Int. Cl.
*G07C 5/08* (2006.01)
*B01D 46/00* (2006.01)

NOX STORAGE CATALYST MONITORING METHODS

INTRODUCTION

The present disclosure relates to an engine exhaust management system for use in a vehicle, and more particularly to a diagnostic system with thermal and chemical sensors.

Significant interest has been focused on the reduction of certain constituents in internal combustion engine exhaust. Recently, focus has been placed on diesel engines. Diesel engine exhaust typically contains gaseous emissions such as carbon dioxide ("CO2"), water vapor ("H2O"), unburned hydrocarbons ("HC"), carbon monoxide ("CO"), and oxides of nitrogen ("NOx") including NO and NO2, along with solid and/or liquid condensed phase materials referred to as particulates. Treatment of diesel engine exhaust may involve various catalytic devices having one or more catalysts disposes on a substrate for reducing the levels of regulated constituents in diesel exhaust. For example, diesel exhaust treatment systems may include an oxidation catalyst, also known as a diesel oxidation catalyst ("DOC") or a passive NOx absorber catalyst ("PNA") such as a diesel cold start catalyst ("DCSC") that stores and/or catalytically reduces exhaust levels of NOx, as well as a selective catalytic reduction ("SCR") catalyst that converts HC and CO to CO2 and water, as well as a particulate filter, also known as a diesel particulate filter ("DPF"), for removal of particulates. In some instances, the SCR is combined with the DPF into a single unit usually referred to as an "SCRF".

One diesel treatment technology of particular interest is the use of PNAs to reduce exhaust NOx in the stream of exhaust. This technology involves the catalytically-enhanced storage and reduction of NOx in the exhaust stream. In order to effectively catalytically reduce NOx in the stream of exhaust, the SCR must reach an appropriate operating temperature. Typical exhaust management systems rely on thermal and/or NOx sensing to determine whether the exhaust system is functioning within normal parameters. Such systems measure temperatures upstream and downstream of a PNA or DCSC, as well as measuring NOx concentration in the exhaust stream upstream of the PNA or DCSC and downstream of the SCR or SCRF. By selecting a known temperature window in which the PNA or DCSC is storing NOx and the SCR/SCRF is not yet active, the pre-DCSC and post SCR NOx sensors can be used to determine whether the DCSC is storing NOx properly. However, because there is a significant physical distance between the NOx sensor upstream of the DCSC and the NOx sensor downstream of the SCR or SCRF, the comparison data of the two NOx sensors above is often lacking in robustness, granularity, and accuracy. In addition, once diesel exhaust fluid (DEF) injection is injected, the NOx sensor downstream of the SCR or SCRF is not able to monitor the PNA (or DCSC) NOx storage any more. Therefore, because it is desirable to trigger the on-board diagnostics (OBDII) system upon recognizing that NOx is not being stored or reduced properly in the exhaust stream, there is a need for monitoring the effectiveness of the exhaust system. Furthermore, there is a need for alerting a user upon reaching a threshold condition for triggering remediation in order to avoid the more severe effects of exhaust component failures that would otherwise cause environmental contamination and regulatory noncompliance.

As such, there is a need for a robust, forward-compatible system and method for performing low-cost on-board diagnostics of low-temperature NOx storage in a passive NOx absorber catalyst as well as high temperature NOx reduction in the exhaust system of a motor vehicle.

SUMMARY

According to an aspect of the present disclosure an engine exhaust treatment system fluidly coupled to an internal combustion engine in a motor vehicle includes a nitrogen oxides (NOx) storage catalyst disposed in an engine exhaust stream downstream of the engine, a selective catalytic reduction (SCR) catalyst disposed in the engine exhaust stream downstream of the NOx storage catalyst, and a plurality of exhaust gas temperature (EGT) sensors disposed in the engine exhaust stream both upstream and downstream of each of the NOx storage catalyst and the SCR catalyst. The system further includes a plurality of NOx sensors disposed in the engine exhaust stream both upstream and downstream of each of the NOx storage catalyst and the SCR catalyst, a diesel particulate filter disposed in the engine exhaust stream downstream of the SCR catalyst and all the NOx sensors, and a control module having a memory, a plurality of input/output ports, and a processor executing functions stored in the memory and receiving information from the input/output ports, the input/output ports in electronic communication with each of the plurality of NOx sensors and the plurality of EGT sensors. The control module having a first logic for determining a first diagnostic condition of the NOx storage catalyst based on data from a first EGT sensor and a second EGT sensor. The control module having a second logic for determining a second diagnostic condition of the NOx storage catalyst based on a comparison of temperatures reported by the first EGT sensor and the second EGT sensor. The control module having a third logic for selectively generating a notification for an operator of the motor vehicle.

In another aspect of the present disclosure the NOx storage catalyst is a passive NOx absorption catalyst (PNA) and the SCR is combined with the DPF to form an SCRF.

In yet another aspect of the present disclosure the first NOx sensor and the first EGT sensor are disposed just upstream of the NOx storage catalyst, and the second NOx sensor and the second EGT sensor are disposed just downstream of the NOx storage catalyst.

In yet another aspect of the present disclosure the first logic further comprises determining a temperature of the NOx storage catalyst.

In yet another aspect of the present disclosure if the temperature of the NOx storage catalyst is below about 250° Celsius, the second logic determines whether a NOx content of the exhaust reported by the first NOx sensor is greater than a NOx content of the exhaust reported by the second NOx sensor by a predetermined amount.

In yet another aspect of the present disclosure the predetermined amount is about 15%.

In yet another aspect of the present disclosure if the temperature of the NOx storage catalyst is above about 350° Celsius, the first logic repeats iteratively and continuously until the NOx storage catalyst is determined to be below about 350° Celsius.

In yet another aspect of the present disclosure once the NOx storage catalyst is determined to be below about 350° Celsius, the second logic determines whether a NOx content of the exhaust reported by the first NOx sensor is greater than a NOx content of the exhaust reported by the second NOx sensor by a predetermined amount.

In yet another aspect of the present disclosure the third logic iteratively repeats the first logic and the second logic a predetermined number of times, and selectively pauses the first logic and the second logic during a predetermined NOx storage catalyst regeneration period before selectively generating a notification for the operator of the motor vehicle.

In yet another aspect of the present disclosure a method for monitoring and diagnosing an engine exhaust treatment system fluidly coupled to an internal combustion engine in a motor vehicle includes monitoring the engine exhaust treatment system. The engine exhaust treatment system includes a nitrogen oxides (NOx) storage catalyst disposed in an engine exhaust stream downstream of the engine, a selective catalytic reduction (SCR) catalyst disposed in the engine exhaust stream downstream of the NOx storage catalyst, and a plurality of exhaust gas temperature (EGT) sensors disposed in the engine exhaust stream both upstream and downstream of each of the NOx storage catalyst and the SCR catalyst. The system further includes a plurality of NOx sensors disposed in the engine exhaust stream both upstream and downstream of each of the NOx storage catalyst and the SCR catalyst, a diesel particulate filter disposed in the engine exhaust stream downstream of the SCR catalyst and all the NOx sensors, and a control module having a memory, a plurality of input/output ports, and a processor executing functions stored in the memory and receiving information from the input/output ports, the input/output ports in electronic communication with each of the plurality of NOx sensors and the plurality of EGT sensors. The method further includes determining a first diagnostic condition of the NOx storage catalyst based on data from a first EGT sensor and a second EGT sensor, determining a second diagnostic condition of the NOx storage catalyst based on a comparison of temperatures reported by the first NOx sensor and the second NOx sensor, selectively pausing the first diagnostic condition and the second diagnostic condition during a predetermined NOx storage catalyst regeneration period, and selectively generating a notification for an operator of the motor vehicle.

In yet another aspect of the present disclosure the NOx storage catalyst is a passive NOx absorption catalyst (PNA), and the SCR and the DPF are within a single device known as an SCRF.

In yet another aspect of the present disclosure the first NOx sensor and the first EGT sensor are disposed just upstream of the NOx storage catalyst, and the second NOx sensor and the second EGT sensor are disposed just downstream of the NOx storage catalyst.

In yet another aspect of the present disclosure determining the first diagnostic condition further comprises determining a temperature of the NOx storage catalyst.

In yet another aspect of the present disclosure if the temperature of the NOx storage catalyst is below about 250° Celsius, determining the second diagnostic condition further comprises determining whether a NOx content of the exhaust reported by the first NOx sensor is greater than a NOx content of the exhaust reported by the second NOx sensor by a predetermined amount.

In yet another aspect of the present disclosure the predetermined amount is about 15%.

In yet another aspect of the present disclosure if the temperature of the NOx storage catalyst is above about 350° Celsius, the first diagnostic repeats iteratively and continuously until the NOx storage catalyst is determined to be below about 350° Celsius.

In yet another aspect of the present disclosure determining the second diagnostic condition further comprises monitoring the NOx storage catalyst and once the NOx storage catalyst is determined to be below about 350° Celsius, determining whether a NOx content of the exhaust reported by the first NOx sensor is greater than a NOx content of the exhaust reported by the second NOx sensor by a predetermined amount.

In yet another aspect of the present disclosure the selectively generating a notification for the operator of the motor vehicle further comprises repeating the first diagnostic and the second diagnostic a predetermined number of times before selectively generating a notification for the operator of the motor vehicle.

In yet another aspect of the present disclosure a method for monitoring and diagnosing an engine exhaust treatment system fluidly coupled to an internal combustion engine in a motor vehicle, the method including monitoring the engine exhaust treatment system. The exhaust treatment system including a passive nitrogen oxides (NOx) absorption catalyst (PNA) disposed in an engine exhaust stream downstream of the engine, a selective catalytic reduction (SCR) catalyst combined with a diesel particulate filter (DPF) to form an SCRF, the SCRF disposed in the engine exhaust stream downstream of the PNA, a plurality of exhaust gas temperature (EGT) sensors including a first exhaust gas temperature (EGT) sensor disposed in the engine exhaust stream upstream of the PNA, and a second EGT sensor disposed in the engine exhaust stream downstream of the PNA, and a plurality of NOx sensors including a first NOx sensor disposed in the engine exhaust stream upstream of the PNA, and a second NOx sensor disposed in the engine exhaust stream downstream of the PNA. The system further includes a control module having a memory, a plurality of input/output ports, and a processor executing functions stored in the memory and receiving information from the input/output ports, the input/output ports in electronic communication with each of the plurality of NOx sensors and the plurality of EGT sensors. The method further including determining a temperature of the PNA based on data from the first EGT sensor and the second EGT sensor, and if the temperature PNA is below about 250° Celsius, determining whether a NOx content of the exhaust stream reported by the first NOx sensor is greater than a NOx content of the exhaust reported by the second NOx sensor by a predetermined amount. If the temperature of the PNA is above about 350° Celsius, iteratively and continuously monitoring the temperature of the PNA until the temperature of the PNA decreases below about 350° Celsius, and once the temperature of the PNA is below about 350° Celsius, determining whether a NOx content of the exhaust reported by the first NOx sensor is greater than a NOx content of the exhaust reported by the second NOx sensor by a predetermined amount. The method further includes selectively pausing the NOx reporting by the first NOx sensor and the second NOx sensor during a predetermined NOx storage catalyst regeneration period, and selectively generating a notification for the operator of the motor vehicle when the NOx content of the exhaust reported by the first NOx sensor is greater than the NOx content of the exhaust reported by the second NOx sensor a predetermined number of times prior to generating the notification.

In yet another aspect of the present disclosure the predetermined amount is at least 15%, and the predetermined number of times is at least 3 times.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
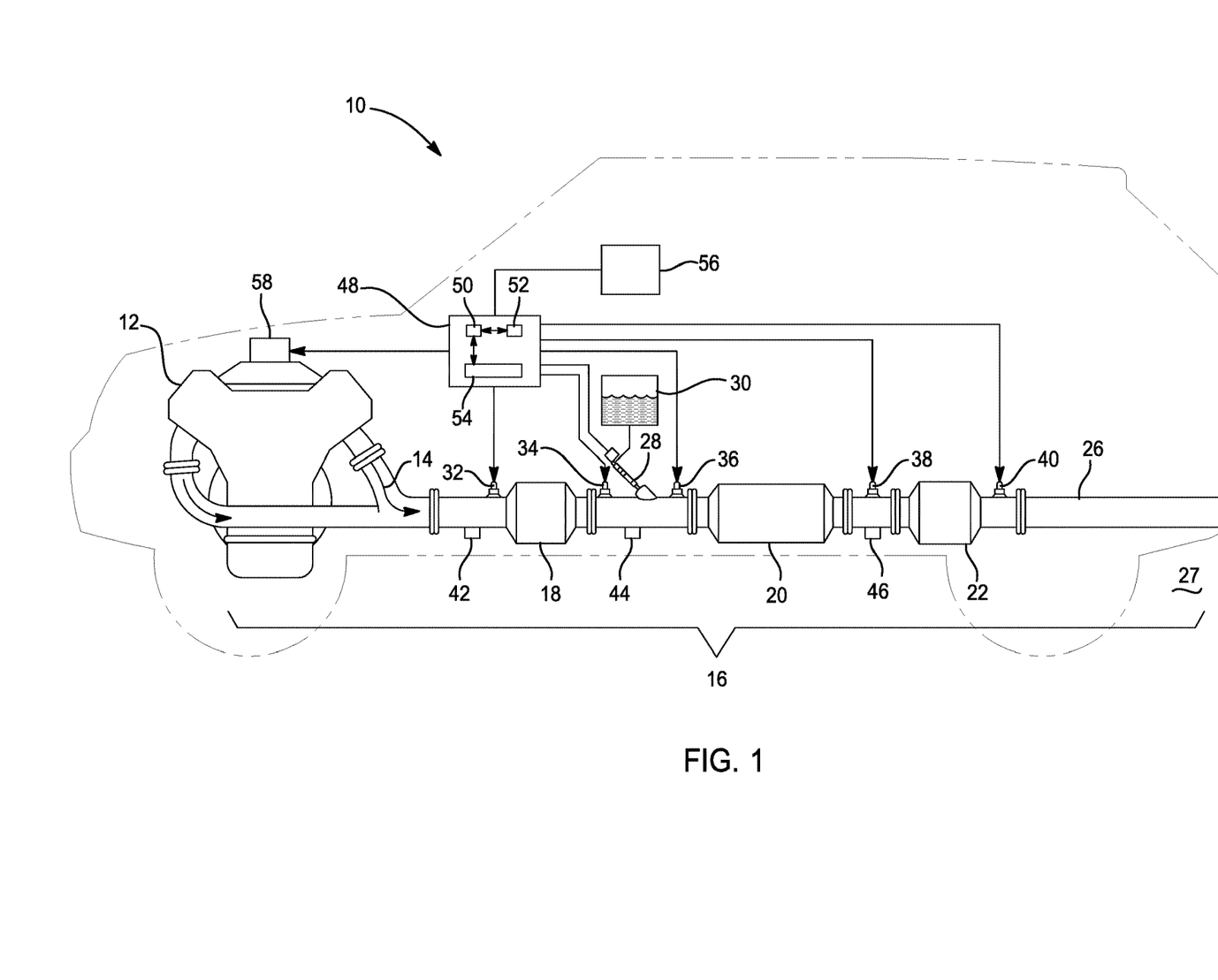
FIG. 1 is a schematic illustration of a vehicle having an exhaust management system according to an aspect of the present disclosure.

Referring now to the drawings, wherein like reference numbers correspond to like or similar components throughout the several figures, a vehicle 10 is shown schematically in FIG. 1. While the vehicle 10 is illustrated as a sport utility vehicle, it should be appreciated that the vehicle 10 may be any type of vehicle, including a car, van, truck, motor home, etc. The vehicle 10 generally includes a prime mover or engine 12. The engine 12 is configured to provide motive power to the vehicle 10 by combustion of supplied fuel and air within at least one combustion chamber (not specifically shown). As a byproduct of combustion, a stream of exhaust 14 including various exhaust constituent products exits the engine 12. Certain exhaust constituents have been recognized as having harmful or detrimental effects on health and/or the environment. Three such potentially harmful or detrimental exhaust constituents resulting from air/fuel combustion within the engine 12 are carbon monoxide (CO), oxides of nitrogen (generally referred to by NOx), and unburned hydrocarbons (HC). To reduce the potential for harmful exhaust emissions entering the atmosphere, the stream of exhaust 14 is directed through an exhaust management system 16 before exiting the vehicle 10 into the atmosphere.

In the example depicted in FIG. 1, the exhaust management system 16 includes a diesel oxidation catalyst (DOC). In some examples, the DOC is replaced by a passive NOx absorption catalyst (PNA) 18, sometimes referred to as a diesel cold start catalyst (DCSC) such as one of Johnson Matthey's DCSC technologies. The exhaust management system 16 further includes a selective catalytic reduction catalyst (SCR) 20, and a diesel particulate filter (DPF) 22. In some instances, the SCR 20 and the DPF 22 are combined into a single unit, known as an SCRF, such as SCRF 24 shown in FIG. 3. The exhaust management system 16 treats the exhaust 14 to remove the CO, NOx, the HC, and the particulates. After being produced by the engine 12, the exhaust 14 first passes through the PNA 18. The PNA 18 functions in at least two capacities, namely as a NOx storage device, and as a DOC. When functioning as a DOC, the PNA 18 oxidizes the CO into carbon dioxide ($CO_2$), and oxidizes the HC into $CO_2$ and water ($H_2O$). In addition, nitric oxide (NO) is oxidized into nitrogen dioxide ($NO_2$) in the PNA 18. Thus, the PNA 18 converts the CO, NO, and HC into $CO_2$, $H_2O$, and $NO_2$. The exhaust 14 then passes into the SCR 20.

In diesel engines, after the exhaust 14 leaves the PNA 18, the exhaust 14 is selectively injected with urea, or ammonia, via a urea injector 28. The urea injector 28 is supplied with a urea solution stored in a urea tank 30. The exhaust 14 mixed with urea enters the SCR 20. The SCR 20 performs reduction reactions on NOx constituents of the exhaust 14, thereby allowing the vehicle 10 to emit fewer harmful emissions for a given engine 12. In other words, the SCR 20 converts or reduces NOx exhaust 14 constituents to elemental nitrogen ($N_2$) and water ($H_2O$). More specifically, the SCR 20 reacts NO, $NH_3$, and $O_2$ to produce $N_2$ and $H_2O$. The SCR 20 also reacts NO, $NH_3$ and $NO_2$ together to produce $N_2$ and $H_2O$.

Having passed through the PNA 18 and the SCR 20, the exhaust 14 enters the DPF 22. The DPF 22 is designed to remove diesel particulate matter or soot from the exhaust gas of a diesel engine. After passing through the DPF 22, substantially cleaned of CO, NOx, HC, and particulates by the PNA 18, SCR 20, and DPF 22, respectively, the exhaust 14 enters the tailpipe 26 before exiting the vehicle 10 to the environment 27. However, because of the way that catalytic converters, such as the PNA 18 and SCR 20 function, such catalytic converters are prone to aging effects and long-term degradation. Thus, it is important to monitor the functionality of the PNA 18 and SCR 20, to ensure that exhaust 14 produced by the vehicle 10 remains within mandated and environmentally-responsible parameters. To effectively monitor the effectiveness of the PNA 18 and the SCR 20, in addition to the PNA 18, SCR 20, and DPF 22, the exhaust management system 16 includes a suite of sensors arranged to monitor exhaust 14 temperatures and NOx content.

Figure 2:
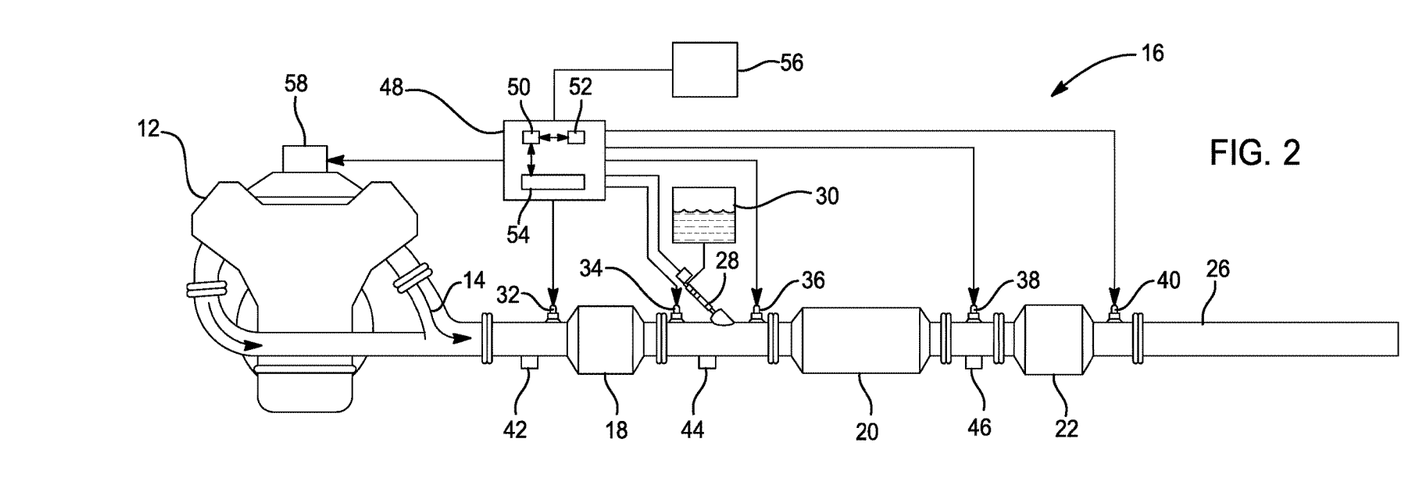
FIG. 2 is a schematic illustration of an exhaust management system according to an aspect of the present disclosure.

Turning now to FIG. 2, and with continuing reference to FIG. 1, in a first exemplary sensor arrangement, a first temperature sensor 32 is located upstream of the PNA 18, a second temperature sensor 34 is located between the PNA 18 and the SCR 20 and proximate the PNA 18, a third temperature sensor 36 is located between the PNA 18 and the SCR 20 and proximate the SCR 20, a fourth temperature sensor 38 is located between the SCR 20 and the DPF 22, and a fifth temperature sensor 40 is located after the DPF 22, proximate the tailpipe 26. The fourth and fifth temperature sensors 38, 40 operate to measure a temperature differential across the DPF 22 and thereby to provide information that helps determine when to inject fuel into the stream of exhaust 14 to burn off stored particulates (soot) within the DPF 22. Additionally, a first NOx sensor 42 is located upstream of the PNA 18, a second NOx sensor 44 is located just downstream from the SCR 20 and prior to the DPF 22, and a third NOx sensor 46 is located just downstream of the SCR 20 and prior to the DPF 22.

Figure 3:
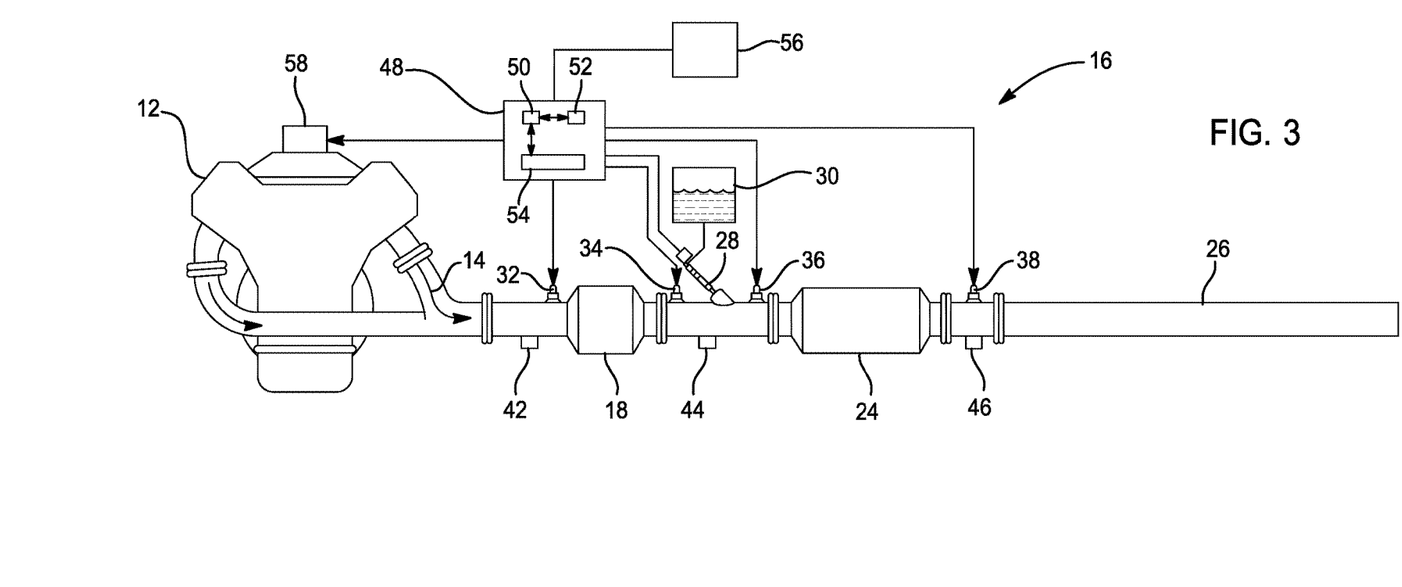
FIG. 3 is a schematic illustration of exhaust management system according to another aspect of the present disclosure.

Turning now to FIG. 3, and with continuing reference to FIGS. 1 and 2, in a second exemplary sensor arrangement in which the exhaust management system 16 includes an SCRF 24 in place of the SCR 20 and the DPF 22 of FIGS. 1 and 2. The first temperature sensor 32 is located upstream of the PNA 18, the second temperature sensor 34 is located between the PNA 18 and the SCRF 24 and proximate the PNA 18, the third temperature sensor 36 is located between the PNA 18 and the SCRF 24 and proximate the PNA 18, the fourth temperature sensor 38 is located between the PNA 18 and the SCRF 24 and proximate the SCRF 24, the first NOx sensor 42 is located upstream of the PNA 18, and the second NOx sensor 44 is located just downstream from the PNA 18 and prior to the SCRF 24, and the third NOx sensor 46 is located just after the SCRF 24 in the stream of exhaust 14.

In both the first and second exemplary sensor arrangements, the exhaust management system 16 sensors 32, 34, 36, 38, 40, 42, 44, 46 are in communication with an electronic control unit or control module 48. The control module 48 is a non-generalized electronic control device having a preprogrammed digital computer or processor 50, memory or non-transitory computer readable medium 52 used to store data such as control logic, instructions, image data, lookup tables, etc., and a plurality of input/output peripherals or ports 54. The processor 50 is configured to execute the control logic or instructions. The control module 48 may have additional processors 50 or additional integrated circuits in communication with the processor 50. The control module 48 can also output to a display 56, such as an instrument cluster, visible to a vehicle occupant. The control module 48 can also communicate with other vehicle systems, such as an engine controller 58. The engine controller 58, like the control module 48 is configured to execute control logic or instructions dictating how the engine 12 runs. That is, the engine controller 58 monitors and controls an air fuel ratio in the combustion chambers of the engine, as well as a variety of other variables pertinent to the operation and function of the engine 12.

Referring once again to FIGS. 1 and 2, in one aspect, the first exemplary sensor arrangement performs cold start NOx storage diagnostics for the engine 12, and for the exhaust management system 16. In order for NOx to effectively be removed from the stream of exhaust 14, certain chemical reactions must occur. Specifically, as discussed above, the PNA 18 serves two distinct functions in the exhaust management system 14. The PNA 18 first functions at low temperatures as a NOx storage device. Then, as the engine 12 warms up and heats the PNA 18 and the SCR 20 or SCRF 24, the PNA 18 secondarily functions as a DOC, oxidizing the CO into carbon dioxide ($CO_2$), and oxidizing the HC into $CO_2$ and water ($H_2O$). In addition, nitric oxide (NO) is oxidized into nitrogen dioxide ($NO_2$) in the PNA 18. Thus, the PNA 18 converts the CO, NO, and HC into $CO_2$, $H_2O$, and $NO_2$. The exhaust 14 then passes into the SCR 20 or SCRF 24. The SCR 20 or SCRF 24 oxidizes the CO in the exhaust 14 into carbon dioxide ($CO_2$), and oxidizes the HC into $CO_2$ and water ($H_2O$). In addition, nitric oxide (NO) is oxidized into nitrogen dioxide ($NO_2$) in the PNA 18. Thus, the PNA 18 converts the CO, NO, and HC into $CO_2$, $H_2O$, and $NO_2$ with a small remainder of NO. In one aspect, for NO to be efficiently and effectively oxidized into $NO_2$ in the PNA 18, the PNA 18 first stores NOx in the exhaust 14 until the NOx can be oxidized properly. That is, the PNA 18 stores NOx until exhaust gas temperatures (EGTs) have warmed the PNA 18 and SCR/SCRF 20, 42 sufficiently for NOx oxidation reactions to occur. More specifically for exhaust temperatures below about 250° Celsius, as determined by the second temperature sensor 34, the control module 48 determines a total engine-out NOx amount based either on readings from the first NOx sensor 42, or from a predetermined combustion model stored in memory 52. In addition, a total NOx amount is measured by the second NOx sensor 44. The total NOx amounts read by the first and second NOx sensors 42, 44 are compared to one another or to NOx amounts in the predetermined combustion model, and if the amount of NOx read by the first NOx sensor 42 is at least 15% higher than the amount of NOx read by the second NOx sensor 44, or the combustion model, the control module 48 determines that the PNA 18 is storing NOx properly. If, however, the first NOx sensor 42 records a NOx amount that is less than a predetermined threshold amount, such as 15%, above a reading reported by the second NOx sensor 44, or the combustion model, the control module 48 iteratively runs the above-referenced comparison to reduce a potential for false readings. Once the control module 48 has determined over a predetermined number of iterations that, the first NOx sensor 42 is reporting a NOx amount that is less than the predetermined threshold amount, the control module 48 notifies the operator of the vehicle 10 that there has been an exhaust management system 16 failure. More specifically, the control module 48 sets a diagnostic code in the on-board diagnostics (OBDII) system of the vehicle 10 that indicates that the NOx storage functionality of the PNA 18 is not within predetermined operating parameters, and illuminates a check engine light (CEL) or malfunction indicator light (MIL) on the display 56. In some aspects, even after the PNA 18 has been flagged for a failure of NOx storage functionality, the control module 48 iteratively and continuously runs the above-referenced comparison and, if over a predetermined number of iterations, the NOx storage functionality of the PNA 18 is determined to be within predetermined operating parameters, the control module 48 may extinguish the CEL or MIL, but still store the OBDII code in memory 52.

In one example, the PNA 18 stores NOx at temperatures below about 350° Celsius. Thus, between an engine 12 cold start and about 350° Celsius, the control module 48 monitors the NOx storage capability and functionality of the PNA 18. However, since it has been determined experimentally that the PNA 18 does not store NOx above about 350° Celsius, and thus functions simply as a DOC at such temperatures, the control module 48 does not monitor NOx storage functionality of the PNA 18 at such temperatures. However, the control module 48 continuously and iteratively monitors the EGT as measured by the second exhaust temperature sensor 34 and if the EGT decreases below about 350° Celsius, the control module 48 begins monitoring PNA 18 NOx storage functionality once more. While the PNA 18 has been described above as operating as a NOx storage device at engine 12 cold start, it should be appreciated that the PNA 18 performs NOx storage at a wide range of temperatures below about 350° Celsius. Thus, even when the engine 12 has been running for a significant amount of time and EGTs have been well in excess of 350° Celsius, the EGTs may decrease significantly if the engine 12 merely idles for an amount of time. In an example when the engine 12 stays for a predetermined period of time in an idling condition or a low speed/low load operating condition, the PNA 18 saturates with NOx, and therefore the NOx storage monitoring of the PNA 18 is terminated for a predetermined period of time or until the PNA 18 reaches a predetermined temperature range and is at least partially relieved of its NOx saturation. That is, once the PNA 18 has been determined to be at a predetermined NOx storage level based on a predetermined amount of time above a predetermined temperature after having been saturated, the NOx storage monitoring of the PNA 18 is reengaged. In some aspects, even when the engine has run for a number of hours without ever having been shut off, the EGTs may be cold enough for the PNA 18 to operate as a NOx storage device. Likewise, even having been at a relatively "cold" idle for a significant amount of time, the EGTs may rise sufficiently above 350° Celsius again, thereby causing the PNA 18 to operate as a DOC.

In an example, in order for NOx in the stream of exhaust 14 to be efficiently and effectively eliminated by the PNA 18, the PNA 18 must reach a temperature at which NOx can be oxidized efficiently. In one aspect, the PNA 18 must reach at least 250° Celsius before NOx can be reduced to N2 and H2O by downstream SCR or SCRF 20, 24. For temperatures above about 250° Celsius, and below about 350° Celsius, the PNA 18 operates in part as a low efficiency NOx storage catalyst. That is, in one aspect, an efficiency of the NOx storage functionality of the PNA 18 is inversely proportional with the temperature of the PNA 18, while the DOC functionality of the PNA 18 is directly proportional with temperature. Thus, for exhaust temperatures below about 250° Celsius, the control module 48 determines a total engine-out NOx amount based either on readings from the first NOx sensor 42, or from a predetermined combustion model stored in memory 52. In addition, a total NOx amount is measured by the second NOx sensor 44. The total NOx amounts read by the first and second NOx sensors 42, 44 are compared to one another, and if the amount of NOx read by the first NOx sensor 42 is at least a predetermined amount, such as 15% higher than the amount of NOx read by the second NOx sensor 44, the control module 48 determines that the PNA 18 is storing NOx properly. In another aspect, the PNA 18 cycles through a regeneration protocol if and when the PNA 18 is determined to have reached a predetermined NOx storage level or temperature. Thereafter, if after the predetermined PNA 18 regeneration, the first NOx sensor 42 records a NOx amount that is less than the predetermined amount higher than the second NOx sensor 44 reading, then the control module 48 notifies the operator of the vehicle 10 that there has been an exhaust management system 16 failure. More specifically, the control module 48 sets a diagnostic code in the OBDII system of the vehicle 10 that indicates that the NOx storage functionality of the PNA 18 is not within predetermined operating parameters, and illuminates a check engine light (CEL) or malfunction indicator light (MIL) on the display 56.

Figure 4:
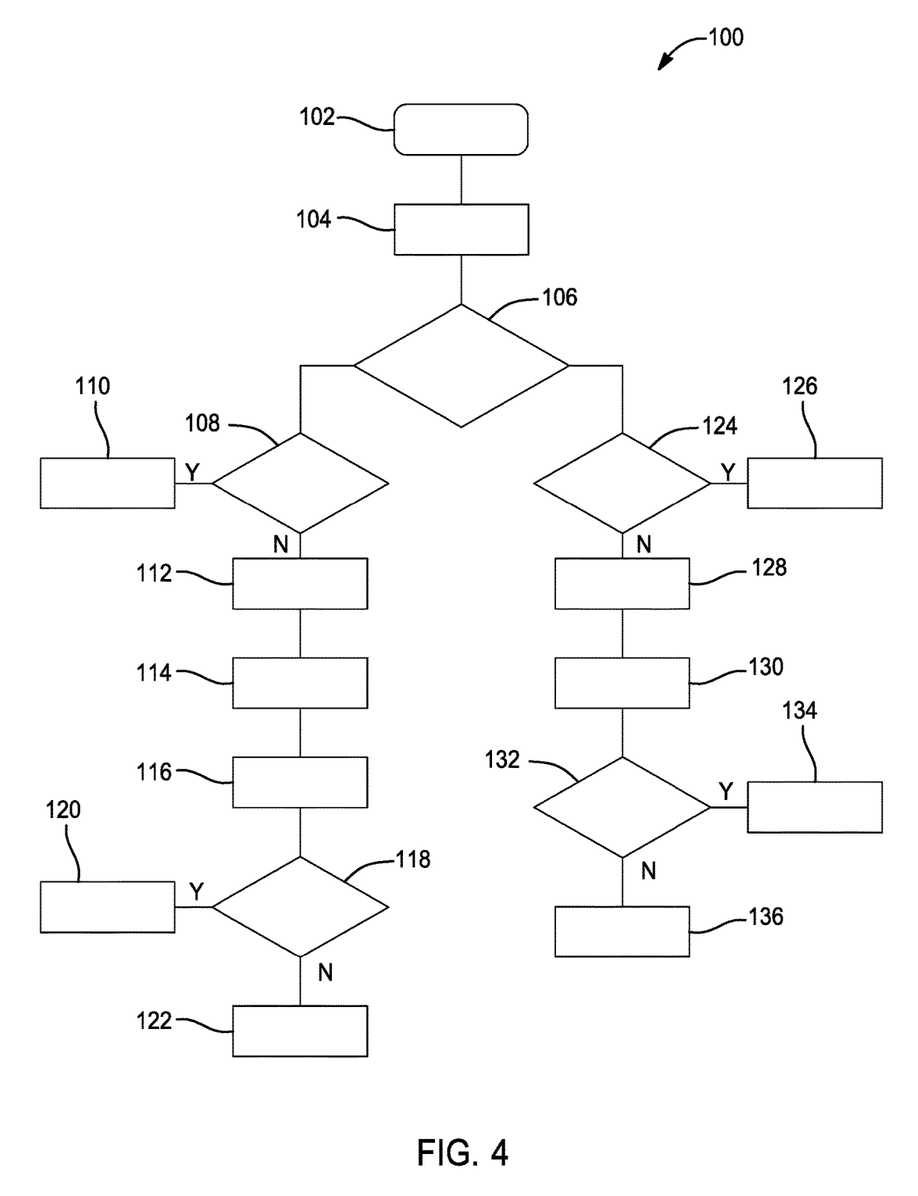
FIG. 4 is a flowchart depicting a method for monitoring NOx storage within a NOx storage catalyst of an exhaust management system according to an aspect of the present disclosure.

Referring now to FIG. 4, and with continuing reference to FIGS. 1 and 2, a method for exhaust management is shown and indicated generally by reference number 100. Generally, the exhaust management method 100 determines the operating efficiency of the exhaust management system 16 and generates a notification for the operator of the vehicle 10 under certain conditions. The method 100 begins at step 102 where the control module 48 determines a diagnostic condition of the exhaust management system 16. In several aspects, the diagnostic conditions are a NOx storage functionality of the PNA 18 as determined by the second exhaust temperature sensor 34 and the first and second NOx sensors 42, 44. In other aspects, the NOx readings are selected from values in a predetermined combustion model. In some instances, the NOx readings may be determined from both first and second NOx sensors 42, 44 and the predetermined combustion model. At step 104, the control module 48 reads an exhaust temperature from the second exhaust temperature sensor 34. At step 106, the control module 48 determines a first diagnostic condition of the PNA 18. In one aspect, the first diagnostic condition is whether the PNA 18 is operating in a cold start situation, and thus, whether the control module 48 should perform cold start NOx storage diagnostics or warm NOx storage diagnostics. If the second exhaust temperature sensor 34 reports a temperature below about 250° Celsius to the control module 48, the control module 48 determines that the engine 12 is performing a cold start and the method 100 proceeds to step 108. At step 108, the control module 48 determines whether the second exhaust temperature sensor 34 has reported temperatures below a predetermined threshold, such as about 250° Celsius, for a predetermined period of time, such as under an idling condition or a low speed/low load operating condition. If the second exhaust temperature sensor 34 has reported temperatures below the predetermined threshold for the predetermined time period, the PNA 18 is determined to have been saturated with NOx. Therefore, the method 100 proceeds to step 110 where the NOx storage monitoring of the PNA 18 is terminated, and the method 100 returns to step 104 to begin monitoring the exhaust temperature once more.

If, however, the second exhaust temperature sensor 34 has not reported temperatures below the predetermined threshold for the predetermined period of time, the method proceeds to step 112 where the control module 48 calculates a total engine out NOx reading from the first NOx sensor 42 or determines a total engine out NOx based on a predetermined combustion model. At step 114, the control module 48 determines a second diagnostic condition of the PNA 18. In one aspect, the second diagnostic condition of the PNA 18 is a total post PNA 18 exhaust NOx reading based on the second NOx sensor 44, or based on a predetermined combustion or calculated NOx storage model for the PNA 18. At step 116, the control module 48 compares the total engine out NOx reading to the total post PNA 18 NOx reading. At step 118, the control module 48 determines whether the total engine out NOx reading is greater than the total post PNA 18 NOx reading by a predetermined amount, for example at least 15%, and thus whether the PNA 18 is properly storing NOx at cold start. If the control module 48 determines that the PNA 18 is properly storing NOx at cold start, the method 100 proceeds to step 120 where the diagnostic method ends, and returns to step 104 where the diagnostic method 100 proceeds to run continuously. If, however, the control module 48 determines that the total engine out NOx reading is not at least a predetermined amount, for example 15%, higher than the total post PNA 18 NOx reading the control module 48 reports that the PNA 18 has failed to properly store NOx at cold start. However, because sometimes the first and second NOx sensors 42, 44 can be slow responding or slow warming up, the first and second NOx sensors 42, 44 can cause the control module 48 to generate a false failure. Therefore, before proceeding to step 122, the control module 48 performs several diagnostic method 100 iterations upon generating a failure before proceeding to step 122. In one example, the control module 48 may run the diagnostic method 100 at least three times, resulting in at least three failures, proceeding to step 122. At step 122, the control module 48 notifies the operator of the vehicle 10 that there has been an exhaust management system 16 failure. More specifically, after a predetermined PNA 18 regeneration, the control module 48 sets a diagnostic code in the OBDII system of the vehicle 10 that indicates that the NOx storage functionality of the PNA 18 is not within predetermined operating parameters, and illuminates a check engine light (CEL) or malfunction indicator light (MIL) on the display 56.

Referring back to step 106, if the second exhaust temperature sensor 34 reports a temperature above about 250° Celsius to the control module 48, the control module 48 determines that the engine 12 is warm and the method 100 proceeds to step 124.

At step 124, the control module 48 determines whether the second exhaust temperature sensor 34 has reported temperatures below a predetermined threshold, such below a predetermined regeneration temperature, such as about 350° Celsius, for the PNA 18, for a predetermined period of time, such as under an idling condition or a low speed/low load operating condition. If the second exhaust temperature sensor 34 has reported temperatures below the predetermined threshold for the predetermined time period, the PNA 18 is determined to have been saturated with NOx. Therefore, the method 100 proceeds to step 126 where the NOx storage monitoring of the PNA 18 is terminated, and the method 100 returns to step 104 to begin monitoring the exhaust temperature once more.

Similarly, at step 124, if the second temperature sensor 34 reports a temperature above about 350° Celsius, the control module 48 determines that the PNA 18 is undergoing a regeneration, and thus is operating as a DOC, and the method 100 proceeds to step 126. At step 126, the NOx storage monitoring of the PNA 18 is terminated, the method 100 ends and returns to step 104 where the method 100 proceeds to run periodically or continuously depending on predetermined parameters, such as EGTs or the like. However, if at step 124, the second temperature sensor 34 reports a temperature between about 250° Celsius and about 350° Celsius, the control module 48 determines a total engine-out NOx amount based either on readings from the first NOx sensor 42, or from a predetermined combustion model stored in memory 52. In addition, at step 128, a total NOx amount is measured by the second NOx sensor 44, or by the predetermined combustion or NOx storage model. At step 130, the total NOx amounts read by the first and second NOx sensors 42, 44 or, or in combination with the predetermined combustion or NOx storage model are compared to one another. At step 130 the control module 48 determines whether the amount of NOx read by the first NOx sensor 42 is at least 15% higher than the amount of NOx read by the second NOx sensor 44, or predicted by the predetermined combustion or NOx storage model. If the control module 48 determines that the amount of NOx read by the first NOx sensor 42 is at least a predefined amount higher than the amount of NOx read by the second NOx sensor 44, or in the predetermined combustion or NOx storage model. In one example, the predefined amount of NOx read by the first NOx sensor 42 is at least 15% higher than the amount of NOx read by the second NOx sensor 44, the control module 48 determines that the PNA 18 is storing and converting NOx properly, and the method 100 proceeds to step 136 where the diagnostic method 100 ends and returns to step 104 where the method 100 proceeds to runs periodically or continuously depending on the situation. If, however, the first NOx sensor 42 records a NOx amount that is less than the predetermined amount higher than the second NOx sensor 44 reading or predetermined combustion or NOx storage model, then the method 100 proceeds to step 134 where the control module 48 notifies the operator of the vehicle 10 that there has been an exhaust management system 16 failure. However, because sometimes the first and second NOx sensors 42, 44 are slow responding or slow warming up, the first and second NOx sensors 42, 44 can cause the control module 48 to generate a false failure. Therefore, the control module 48 performs several diagnostic method 100 iterations upon generating a failure before proceeding to step 134. In one example, the control module 48 may run the diagnostic method 100 at least three times, resulting in at least three failures, before proceeding to step 134. More specifically, at step 134 the control module 48 sets a diagnostic code in the OBDII system of the vehicle 10 that indicates that the NOx storage functionality of the PNA 18 is not within predetermined operating parameters, and illuminates a check engine light (CEL) or malfunction indicator light (MIL) on the display 56.

Additionally, while this exemplary algorithm relates to exhaust management in a vehicle 10, it is to be understood that the exhaust management system discussed herein can be applied to various types of prime movers, whether mobile or stationary. For example, a construction site may operate with various stationary generators active at one time. Any combustible system with exhaust gas constituents similar in nature to those discussed herein may be adapted to utilize one or more of the systems and methods described herein as adaptable by one of skill in the art.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An engine exhaust treatment system fluidly coupled to an internal combustion engine in a motor vehicle, the engine exhaust treatment system comprising:
   a nitrogen oxides (NOx) storage catalyst disposed in an engine exhaust stream downstream of the engine;
   a selective catalytic reduction (SCR) catalyst disposed in the engine exhaust stream downstream of the NOx storage catalyst;
   a plurality of exhaust gas temperature (EGT) sensors disposed in the engine exhaust stream both upstream and downstream of each of the NOx storage catalyst and the SCR catalyst;
   a plurality of NOx sensors disposed in the engine exhaust stream both upstream and downstream of each of the NOx storage catalyst and the SCR catalyst;
   a diesel particulate filter disposed in the engine exhaust stream downstream of the SCR catalyst and all the NOx sensors;
   a control module having a memory, a plurality of input/output ports, and a processor executing functions stored in the memory and receiving information from the input/output ports, the input/output ports in electronic communication with each of the plurality of NOx sensors and the plurality of EGT sensors;
   the control module having a first logic for determining a first diagnostic condition of the NOx storage catalyst based on data from a first EGT sensor and a second EGT sensor;
   the control module having a second logic for determining a second diagnostic condition of the NOx storage catalyst based on a comparison of temperatures reported by the first EGT sensor and the second EGT sensor; and
   the control module having a third logic for selectively generating a notification for an operator of the motor vehicle.

2. The system of claim 1 wherein a first NOx sensor and the first EGT sensor are disposed just upstream of the NOx storage catalyst, and a second NOx sensor and the second EGT sensor are disposed just downstream of the NOx storage catalyst.

3. The system of claim 1 wherein the first logic further comprises determining a temperature of the NOx storage catalyst.

4. The system of claim 3 wherein if the temperature of the NOx storage catalyst is below 250° Celsius, the second logic determines whether a NOx content of exhaust reported by a first NOx sensor is greater than a NOx content of exhaust reported by a second NOx sensor by a predetermined amount.

5. The system of claim 4 wherein the predetermined amount is 15%.

6. The system of claim 3 wherein if the temperature of the NOx storage catalyst is above 350° Celsius, the first logic repeats iteratively and continuously until the NOx storage catalyst is determined to be below 350° Celsius.

7. The system of claim 6 wherein once the NOx storage catalyst is determined to be below 350° Celsius, the second logic determines whether a NOx content of exhaust reported by a first NOx sensor is greater than a NOx content of exhaust reported by a second NOx sensor by a predetermined amount.

8. The system of claim 1 wherein the third logic iteratively repeats the first logic and the second logic a predetermined number of times, and selectively pauses the first logic and the second logic during a predetermined NOx storage catalyst regeneration period before selectively generating the notification for the operator of the motor vehicle.

9. A method for monitoring and diagnosing an engine exhaust treatment system fluidly coupled to an internal combustion engine in a motor vehicle, the method comprising:
    monitoring the engine exhaust treatment system, the system including:
        a nitrogen oxides (NOx) storage catalyst disposed in an engine exhaust stream downstream of the engine;
        a selective catalytic reduction (SCR) catalyst disposed in the engine exhaust stream downstream of the NOx storage catalyst;
        a plurality of exhaust gas temperature (EGT) sensors disposed in the engine exhaust stream both upstream and downstream of each of the NOx storage catalyst and the SCR catalyst;
        a plurality of NOx sensors disposed in the engine exhaust stream both upstream and downstream of each of the NOx storage catalyst and the SCR catalyst;
        a diesel particulate filter disposed in the engine exhaust stream downstream of the SCR catalyst and all the NOx sensors;
        a control module having a memory, a plurality of input/output ports, and a processor executing functions stored in the memory and receiving information from the input/output ports, the input/output ports in electronic communication with each of the plurality of NOx sensors and the plurality of EGT sensors;
    determining a first diagnostic condition of the NOx storage catalyst based on data from a first EGT sensor and a second EGT sensor;
    determining a second diagnostic condition of the NOx storage catalyst based on a comparison of temperatures reported by the first EGT sensor and the second EGT sensor;
    selectively pausing the first diagnostic condition and the second diagnostic condition during a predetermined NOx storage catalyst regeneration period; and
    selectively generating a notification for an operator of the motor vehicle.

10. The method of claim 9 wherein a first NOx sensor and the first EGT sensor are disposed just upstream of the NOx storage catalyst, and a second NOx sensor and the second EGT sensor are disposed just downstream of the NOx storage catalyst.

11. The method of claim 9 wherein determining the first diagnostic condition further comprises determining a temperature of the NOx storage catalyst.

12. The method of claim 11 wherein based on the temperature of the NOx storage catalyst being below 250° Celsius, determining the second diagnostic condition further comprises determining whether a NOx content of exhaust reported by a first NOx sensor is greater than a NOx content of exhaust reported by a second NOx sensor by a predetermined amount.

13. The method of claim 12 wherein the predetermined amount is 15%.

14. The method of claim 11 wherein based on the temperature of the NOx storage catalyst being above 350° Celsius, the first diagnostic repeats iteratively and continuously until the NOx storage catalyst is determined to be below 350° Celsius.

15. The method of claim 14 wherein determining the second diagnostic condition further comprises monitoring the NOx storage catalyst and based on the NOx storage catalyst being determined to be below 350° Celsius, determining whether a NOx content of exhaust reported by a first NOx sensor is greater than a NOx content of exhaust reported by a second NOx sensor by a predetermined amount.

16. The method of claim 9 wherein the selectively generating a notification for the operator of the motor vehicle further comprises repeating the first diagnostic and the second diagnostic a predetermined number of times before selectively generating a notification for the operator of the motor vehicle.

17. A method for monitoring and diagnosing an engine exhaust treatment system fluidly coupled to an internal combustion engine in a motor vehicle, the method comprising:
    monitoring the engine exhaust treatment system, the system including:
        a passive nitrogen oxides (NOx) absorption catalyst (PNA) disposed in an engine exhaust stream downstream of the engine;
        a selective catalytic reduction (SCR) catalyst combined with a diesel particulate filter (DPF) to form an SCRF, the SCRF disposed in the engine exhaust stream downstream of the PNA;
        a plurality of exhaust gas temperature (EGT) sensors including a first exhaust gas temperature (EGT) sensor disposed in the engine exhaust stream upstream of the PNA, and a second EGT sensor disposed in the engine exhaust stream downstream of the PNA;
        a plurality of NOx sensors including a first NOx sensor disposed in the engine exhaust stream upstream of the PNA, and a second NOx sensor disposed in the engine exhaust stream downstream of the PNA;
        a control module having a memory, a plurality of input/output ports, and a processor executing functions stored in the memory and receiving information from the input/output ports, the input/output ports in electronic communication with each of the plurality of NOx sensors and the plurality of EGT sensors;
    determining a temperature of the PNA based on data from the first EGT sensor and the second EGT sensor, wherein
        based on the temperature of the PNA being below 250° Celsius:
            determining whether a NOx content of the exhaust stream reported by the first NOx sensor is greater than a NOx content of the exhaust reported by the second NOx sensor by a predetermined amount; and
        based on the temperature of the PNA being above 350° Celsius,
            iteratively and continuously monitoring the temperature of the PNA until the temperature of the PNA decreases below 350° Celsius, and once the temperature of the PNA is below 350° Celsius, determining whether a NOx content of the exhaust reported by the first NOx sensor is greater than a NOx content of the exhaust reported by the second NOx sensor by a predetermined amount;

selectively pausing the NOx reporting by the first NOx sensor and the second NOx sensor during a predetermined NOx storage catalyst regeneration period; and selectively generating a notification for the operator of the motor vehicle based on the NOx content of the exhaust reported by the first NOx sensor being greater than the NOx content of the exhaust reported by the second NOx sensor a predetermined number of times prior to generating the notification.

18. The method of claim 17 wherein the predetermined amount is at least 15%, and the predetermined number of times is at least 3 times.

\* \* \* \* \*